United States Patent

Nagashima

[11] Patent Number: 5,876,823
[45] Date of Patent: Mar. 2, 1999

[54] OPTICAL INFORMATION MEDIUM, METHOD FOR PRODUCING THE OPTICAL INFORMATION MEDIUM, AND UNIT FOR PRODUCING THE OPTICAL INFORMATION MEDIUM

[75] Inventor: Michiyoshi Nagashima, Ikoma, Japan

[73] Assignee: Matsushita Electric Industrial Co., Ltd., Japan

[21] Appl. No.: 926,300

[22] Filed: Sep. 5, 1997

Related U.S. Application Data

[63] Continuation of Ser. No. 537,634, Oct. 2, 1995, abandoned.

[30] Foreign Application Priority Data

Oct. 3, 1994 [JP] Japan ................................. 6-238846
Nov. 30, 1994 [JP] Japan ................................. 6-297135

[51] Int. Cl.$^6$ .................................................. B32B 3/00
[52] U.S. Cl. ................. 428/64.1; 428/64.2; 428/64.4; 428/65.2; 428/457; 428/913; 430/270.12; 430/495.1; 430/945; 369/275.1; 369/283; 369/288
[58] Field of Search .................... 428/64.1, 64.2, 428/64.4, 65.2, 457, 913; 430/270.12, 495.1, 945; 369/275.1, 275.2, 283, 288

[56] References Cited

U.S. PATENT DOCUMENTS

| | | | |
|---|---|---|---|
| 4,954,379 | 9/1990 | Nishida et al. | 428/64 |
| 4,985,289 | 1/1991 | Kameaki et al. | 428/64 |
| 5,039,558 | 8/1991 | Imai et al. | 427/162 |
| 5,059,473 | 10/1991 | Takahashi et al. | 428/162 |
| 5,128,388 | 7/1992 | Komori et al. | 522/95 |
| 5,134,604 | 7/1992 | Nagashima et al. | 369/94 |
| 5,154,957 | 10/1992 | Yamada et al. | 428/64 |
| 5,227,213 | 7/1993 | Komori et al. | 428/65.1 |
| 5,232,505 | 8/1993 | Nouak et al. | 118/712 |
| 5,314,734 | 5/1994 | Nishida et al. | 428/64 |
| 5,360,652 | 11/1994 | Kobayahi et al. | 428/64 |

FOREIGN PATENT DOCUMENTS

| | | |
|---|---|---|
| 0408763 | 1/1991 | European Pat. Off. . |
| 0528106 | 2/1993 | European Pat. Off. . |
| 3840391 | 6/1989 | Germany . |
| 4041199 | 7/1992 | Germany . |
| 4235178 | 5/1993 | Germany . |
| 54-54003 | 4/1979 | Japan . |
| 57-133532 | 8/1982 | Japan . |
| 63-27577 | 2/1988 | Japan . |
| 2249150 | 10/1990 | Japan . |
| 3209642 | 9/1991 | Japan . |
| 520714 | 1/1993 | Japan . |
| 6131704 | 5/1994 | Japan . |
| 6274940 | 9/1994 | Japan . |
| 2004404 | 3/1979 | United Kingdom . |
| 2017379 | 10/1979 | United Kingdom . |

OTHER PUBLICATIONS

Official Action from Japanese Patent Applicaton No. 7-253357.

*Primary Examiner*—Elizabeth Evans
*Attorney, Agent, or Firm*—Renner, Otto, Boisselle & Sklar, P.L.L.

[57] ABSTRACT

The optical information medium of the invention includes: a first substrate having a first information signal layer; a first reflective film formed on the first information signal layer of the first substrate; a second substrate having a second information signal layer; a second reflective film formed on the second information signal layer of the second substrate; and a photopolymer resin film provided between the first reflective film and the second reflective film for bonding the first substrate and the second substrate with each other.

21 Claims, 10 Drawing Sheets

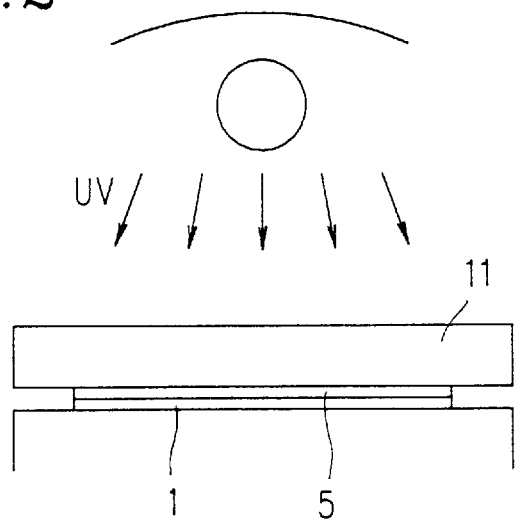

OPTICAL INFORMATION MEDIUM, METHOD FOR PRODUCING THE OPTICAL INFORMATION MEDIUM, AND UNIT FOR PRODUCING THE OPTICAL INFORMATION MEDIUM

This is a continuation of application Ser. No. 08/537,634 filed on Oct. 2, 1995 now abandoned.

BACKGROUND OF THE INVENTION

1. Field of the Invention

The present invention relates to an optical information medium formed by bonding two optical information substrates with each other; a method for producing the same; and a unit for producing the same. The present invention also relates to an optical information medium having two information signal layers for recording/reproducing information thereon/therefrom by irradiating and focusing a laser beam thereon; a method for producing the same; and a unit for producing the same.

2. Description of the Related Art

Recently, various optical information media such as an optical card and an optical disk have been practically used. A compact disk (hereinafter, simply referred to as a "CD"), in particular, has become remarkably popular. The video and audio information recorded as digital signals on a CD-ROM can now be processed easily by a computer. As a result, the value and the utility of a CD have been considerably increased in the information industry.

In order to record/reproduce high-density information onto/from an optical disk, it is necessary to shorten the wavelength of the laser beam to be used for the recording and the reproduction and increase the numerical aperture (NA) of an objective lens. Thanks to the remarkable development in the technologies for producing semiconductor laser devices, video compression technologies and various kinds of peripheral technologies, it is currently possible to record video and audio information on one side of a disk with a diameter of 120 mm for a long time. For example, by using an objective lens with an NA of 0.6 and a red semiconductor laser with a wavelength of 650 nm, it is possible to reproduce information from the signal pits with a track pitch of 0.74 $\mu$m and a pit length as short as 0.40 $\mu$m in a highly reliable manner. If an 8–15 system is used as a modulation system, then one bit length becomes 0.25 $\mu$m. Therefore, it is possible to accomplish a density higher than that of a CD by 5 times or more. By setting the redundancy to be about 15%, information having a capacity of about 5 Gigabytes can be recorded on a disk with a diameter of 120 mm, and video and audio signals in compliance with MPEG 2 standard can be recorded at 4.7 Mbps on average on one side of a disk with an equal size to that of a CD for about 142 minutes.

However, the allowable disk tilt of an objective lens with an increased NA is very small. For example, if a substrate with a thickness equal to that of a CD, i.e., 1.2 mm, is used, then the tilt allowable for an objective lens with an NA of 0.6 is about 0.25 degrees. The tilt is no larger than the error to be caused in installing an optical head onto a player. Therefore, if a tilt is caused by a deformation on the disk, then such a tilt is not allowable. Accordingly, it is difficult to practically use an objective lens with such a small tilt.

By thinning the thickness of the substrate, such an objective lens with an increased NA can be used and a practical high-density optical disk can be accomplished. For example, by reducing the thickness of the substrate to one half of the thickness of a CD, i.e., 0.6 mm, the tilt allowable for an objective lens with an NA of 0.6 can be enlarged to about 0.75 degrees. As a result, even when an error of about 0.25 degrees is caused in installing an optical head, a tilt up to 0.5 degrees, actually caused by a deformation on a disk, is still allowable.

First, a method for producing a CD will be briefly described for comparison. By using a stamper on which an audio signal is recorded, a substrate, a side of which is used for recording the audio signal, is produced so as to be 1.2 mm thick by an injection molding method. Then, a reflective film made of aluminum or the like is formed on the audio signal recording surface by a sputtering method. Next, a photopolymer resin is applied on the reflective film and then irradiated with ultraviolet (UV) rays, thereby forming a protective film. A CD is produced in this way.

If an optical disk with a single thin substrate is formed, then the disk is likely to be deformed by the weight thereof. In order to prevent such deformation, two substrates are bonded with each other. By attaching the two substrates, not only the mechanical strength of the disk can be increased but also the capacity of the disk is doubled, because the area usable for recording/reproducing the information thereon/therefrom can be doubled.

A conventional method for producing such a disk formed by the bonding of two thin substrates will be described. First, by using a stamper on which information signals such as video signals and audio signals are recorded, a first thin substrate, a side of which is used for recording the information signals thereon, is produced by an injection molding method.

Then, a reflective film made of aluminum or the like is formed on the information signal layer by a sputtering method. Next, a photopolymer resin is applied on the reflective film and then irradiated with UV rays, thereby forming a protective film. Furthermore, a second thin substrate is formed by using a second stamper on which different information signals are recorded, and then another reflective film and another protective film are formed in the same manner as the above.

Thereafter, a hot-melt adhesive is applied onto the protective film of each of the two substrates by using a roll coater; the two substrates are bonded with each other so that the hot-melt adhesives applied on the surface of each of the protective films are bonded with each other; and then pressure is applied to the assembly, thereby forming a bonded disk obtained by assembling the first and the second substrates. This bonding method using a hot-melt adhesive is the same as the method used for producing a laser disk.

The disk thus formed has a configuration in which the two substrates are integrated by opposing the protective films of the two substrates to each other and forming a hot-melt adhesive layer therebetween.

The configuration of such a conventional bonded disk will be described with reference to FIG. 8. As shown in FIG. 8, an information signal layer 102 is formed on one side of a first substrate 101. A reflective film 103 made of a metallic material mainly composed of aluminum or the like is formed on the information signal layer 102, and a protective film 104 is further formed thereon. On the other hand, an information signal layer 106 is formed on one side of a second substrate 105. In the same way, a reflective film 107 and a protective film 108 are formed on the information signal layer 106. A hot-melt adhesive layer 109 is further provided between the protective films 104 and 108 opposed to each other, thereby integrally bonding the first substrate 101 and the second substrate 105.

In order to realize an alternative optical information medium, a method in which two information signal layers for recording/reproducing information thereon/therefrom are formed by irradiating and focusing a laser beam from the same direction is disclosed in Japanese Laid-Open Patent Publication No. 3-209642 and U.S. Pat. No. 5,134,604. The reflectance of one of the information signal layers which is located closer to the laser beam incoming side is reduced, so that a sufficient amount of the laser beam can reach the other information signal layer distant from the laser beam incoming side and the information recorded on the respective information signal layers can be independently read out. Therefore, by using an optical information medium with the same size as that of a conventional medium, the area usable as the recording region can be doubled and the recording capacity can be considerably increased.

With respect to such a conventional dual-layer disk, the operational principle of the disk where the two information signal layers are exclusively used for reproducing the information therefrom will be described. FIG. 9 shows a case where the laser beam is focused on one of the two information signal layers which is distant from the laser beam incoming side. In FIG. 9, an information signal layer 152 is formed on one side of a transparent substrate 151 made of glass, resin, or the like. A semi-transparent thin film 153 is formed on the information signal layer 152 so as to partially reflect the laser beam. Another information signal layer 180 is formed over the semi-transparent thin film 153 via a transparent material 154. Since it is preferable for a reflective film 181 formed on the information signal layer 180 to reflect substantially all of the incoming laser beam, the reflective film 181 is made of a metallic material such as aluminum. A protective film 182 made of photopolymer resin or the like is further formed on the reflective film 181. The laser beam focused and incident on the information signal layer 180 is denoted by 171.

In the case where the laser beam is focused on the information signal layer 180, the information signals recorded on the information signal layer 180 can be reproduced, while the laser beam is partially reflected by the information signal layer 152 as denoted by 172 before the laser beam reaches the information signal layer 180. In such a case, if the thickness of the transparent material 154 is sufficiently large, then the spot size of the laser beam on the information signal layer 152 becomes sufficiently large, so that the signals recorded on the information signal layer 152 cannot be reproduced, and the signals reproduced from the information signal layer 180 are not adversely affected by the signals recorded on the information signal layer 152. In addition, if the semi-transparent thin film 153 on the information signal layer 152 is formed so as to have a uniform thickness, then a local phase change is not generated in the incoming laser beam, and the diffraction phenomenon undesirable for reproducing a signal can be suppressed at a negligible level. On the other hand, in the case where the laser beam is focused on the information signal layer 152 closer to the laser beam incoming side, the laser beam is transmitted through the semi-transparent thin film 153. However, since the spot size of the laser beam on the information signal layer 180 becomes sufficiently large, the information signals recorded on the information signal layer 180 cannot be reproduced, and the signals reproduced from the information signal layer 152 are not adversely affected by the signals recorded on the information signal layer 180.

FIGS. 10A to 10C show a method for producing such a dual-layer optical information medium. The transparent substrate 151 having the information signal layer 152 formed on one side thereof is formed by an injection molding method or the like in the same way as a CD substrate. As shown in FIG. 10A, the semi-transparent thin film 153 is formed on the information signal layer 152 by a sputtering method or a vacuum evaporation method using a target 161. The target 161 is a material for composing the semi-transparent thin film 153 and is made of a metal such as Au and Al or a dielectric such as ZnS. Then, as shown in FIG. 10B, a photopolymer resin 154 to become the transparent material 154 is inserted between a stamper 162 for forming the information signal layer 180 and the semi-transparent thin film 153 formed on the information signal layer 152; pressure is applied to the stamper 162 so as to obtain a predetermined thickness of the transparent material 154; and then UV rays 164 are irradiated through the semi-transparent thin film 153 and the transparent material 154.

Next, as shown in FIG. 10C, the reflective film 181 is formed on the information signal layer 180 obtained by removing the stamper 162 by a sputtering method or a vacuum evaporation method using a target 165. In the case where the information signal layer 180 is to be exclusively used for the reproduction, the target 165 is made of a metallic material such as aluminum. On the other hand, in the case where the information signal layer 180 is to be used for the recording and the reproduction, the target 165 is made of a phase-changeable material or a magneto-optical material. In performing this production method, the transparent substrate 151 and the semi-transparent thin film 153 are required to transmit the UV rays. Finally, the protective film 182 is formed on the reflective film 181 by using the photopolymer resin.

Since a conventional bonded disk is produced by a hot-melt method, the cost is considerably increased because an additional equipment such as a roll coater for applying a hot-melt adhesive and a presser is required in addition to the apparatus for producing a CD. On the other hand, since a new type of disk suitable for the use in a car is required to be developed from now on, such a disk is required to be resistant to the environment where the temperature reaches up to about 80° C. and the humidity reaches up to about 85% for a long time. However, the hot-melt adhesive is softened at such a high temperature and high humidity, so that the disk is adversely deformed to exceed the allowable disk tilt.

According to the conventional method for producing the dual-layer optical information medium, when the information signal layer distant from the laser beam incoming side is formed, a photopolymer resin is inserted between the stamper on which the information is recorded and the semi-transparent thin film formed on the information signal layer closer to the laser beam incoming side, and the UV rays are irradiated through the information signal layer closer to the laser beam incoming side while applying pressure to the resin. Accordingly, a process step for curing the resin with the UV rays and a process step for removing the resin from the stamper are required to be performed for producing each disk. In addition, a certain amount of time is required for removing the cured resin from the stamper and dust is likely to be attached to the resin, so that productivity is decreased, the cost necessary for producing the optical information medium becomes high and the optical information medium has many defects.

SUMMARY OF THE INVENTION

The optical information medium of the invention includes: a first substrate having a first information signal layer; a first reflective film formed on the first information signal layer of the first substrate; a second substrate having a second information signal layer; a second reflective film formed on the second information signal layer of the second substrate; and a photopolymer resin film provided between the first reflective film and the second reflective film for bonding the first substrate and the second substrate with each other.

In one embodiment, the first and the second reflective films are made of a metallic material mainly composed of aluminum.

In another embodiment, at least one of the first and the second reflective films has a thickness of 0.1 $\mu$m or less.

In still another embodiment, the first and the second substrates have a substantially equal thickness.

In still another embodiment, the first and the second substrates have a thickness of 0.57 mm to 0.63 mm.

In still another embodiment, a pit art is formed on at least one of the first information signal layer and the second information signal layer.

In still another embodiment, a recording material film is provided at least one of between the first substrate and the first reflective film and between the second substrate and the second reflective film.

According to another aspect of the present invention, a method for producing an optical information medium is provided. The method includes the steps of: forming a first substrate having a first information signal layer on one side thereof; forming a first reflective film on the first information signal layer of the first substrate; forming a second substrate having a second information signal layer on one side thereof; forming a second reflective film on the second information signal layer of the second substrate; superposing the first and the second substrates so that the first and the second reflective films are opposed to each other with a photopolymer resin therebetween; and irradiating the photopolymer resin with light at least through the second substrate and the second reflective film so as to perform a multiple reflection of a part of the light between the first and the second reflective films and cure the photopolymer resin, thereby bonding the first and the second substrates with each other.

In one embodiment, the step of superposing the first and the second substrates includes the steps of applying the photopolymer resin in a donut shape while rotating the first substrate, and superposing the second substrate on the first substrate so that the first and the second reflective films are opposed to each other via the photopolymer resin so as to integrally rotate the first and the second substrates.

In another embodiment, the method for producing an optical information medium, further includes a step of disposing a transparent plate on the second substrate so as to press the second substrate via the transparent plate after performing the step of superposing the second substrate on the first substrate so as to integrally rotate the first and the second substrates.

According to still another aspect of the present invention, a unit for producing an optical information medium by bonding a first substrate including a first reflective film formed on a first information signal layer of the first substrate and a second substrate including a second reflective film formed on a second information signal layer of the second substrate with each other is provided. The unit includes: an apparatus for applying a photopolymer resin on the first reflective film while rotating the first substrate; an apparatus for superposing the second substrate on the photopolymer resin so that the first and the second reflective films are opposed to each other; an apparatus for integrally rotating the first and the second substrates; and an apparatus for irradiating the photopolymer resin with light.

According to still another aspect of the present invention, a unit for producing an optical information medium by bonding a first substrate including a first reflective film formed on a first information signal layer of the first substrate and a second substrate including a second reflective film formed on a second information signal layer of the second substrate with each other is provided. The unit includes: an apparatus for applying a photopolymer resin on the first reflective film while rotating the first substrate; an apparatus for superposing the second substrate on the photopolymer resin so that the first and the second reflective films are opposed to each other; an apparatus for integrally rotating the first and the second substrates; an apparatus for pressing the second substrate via a transparent plate; and an apparatus for irradiating the photopolymer resin with light.

According to still another aspect of the present invention, a unit for producing an optical information medium is provided. The unit includes: a first production block including a first molding machine for forming a first substrate including a first information signal layer thereon, and a first sputtering apparatus for forming a first reflective film on the first information signal layer of the first substrate; a second production block including a second molding machine for forming a second substrate including a second information signal layer thereon, and a second sputtering apparatus for forming a second reflective film on the second information signal layer of the second substrate; a third production block for opposing the first reflective film of the first substrate and the second reflective film of the second substrate via a photopolymer resin film and then irradiating the photopolymer resin film with light at least through the second substrate and the second reflective film; and a transporter for moving the first substrate from the first production block to the third production block and moving the second substrate from the second production block to the third production block, respectively.

The optical information medium according to still another aspect of the present invention includes: a first substrate having a first information signal layer; a semi-transparent film formed on the first information signal layer of the first substrate; a second substrate having a second information signal layer; a reflective film formed on the second information signal layer of the second substrate; and a photopolymer resin film provided between the semi-transparent film and the reflective film for bonding the first substrate and the second substrate with each other.

In one embodiment, the reflective film includes a recording material film.

In another embodiment, a thickness of the first substrate is in a range of 0.55 to 0.61 mm.

In still another embodiment, a thickness of the photopolymer resin is in a range of 30 to 60 $\mu$m.

According to still another aspect of the present invention, a method for producing an optical information medium is provided. The method includes the steps of: forming a first substrate having a first information signal layer on one side thereof; forming a semi-transparent film on the first information signal layer of the first substrate; forming a second substrate having a second information signal layer on one side thereof; forming a reflective film on the second information signal layer of the second substrate; superposing the first and the second substrates so that the semi-transparent film and the reflective film are opposed to each other with a photopolymer resin therebetween; and irradiating the photopolymer resin with light at least through the first substrate and the semi-transparent film so as to perform a multiple reflection of a part of the light between the semi-transparent film and the reflective film and cure the photopolymer resin, thereby bonding the first and the second substrates with each other.

According to still another aspect of the present invention, a unit for producing an optical information medium is provided. The unit includes: a first production block including a first molding machine for forming a first substrate including a first information signal layer thereon, and a first sputtering apparatus for forming a semi-transparent film on the first information signal layer of the first substrate; a second production block including a second molding machine for forming a second substrate including a second information signal layer thereon, and a second sputtering apparatus for forming a reflective film on the second information signal layer of the second substrate; a third production block for opposing the semi-transparent film on the first substrate and the reflective film on the second substrate with each other with a photopolymer resin film therebetween and then irradiating the photopolymer resin film with light at least through the first substrate and the semi-transparent film; and a transporter for moving the first substrate from the first production block to the third production block and moving the second substrate from the second production block to the third production block, respectively.

Thus, the invention described herein makes possible the advantage of providing an optical information medium which can be produced with a high yield and at a lower cost so as to have less defects, a method for producing the same and a unit for producing the same.

This and other advantages of the present invention will become apparent to those skilled in the art upon reading and understanding the following detailed description with reference to the accompanying figures.

BRIEF DESCRIPTION OF THE DRAWINGS

FIG. 2 illustrates a UV ray irradiation process step in a method for producing an optical information medium of the present invention.

DESCRIPTION OF THE PREFERRED EMBODIMENTS

Figure 1:
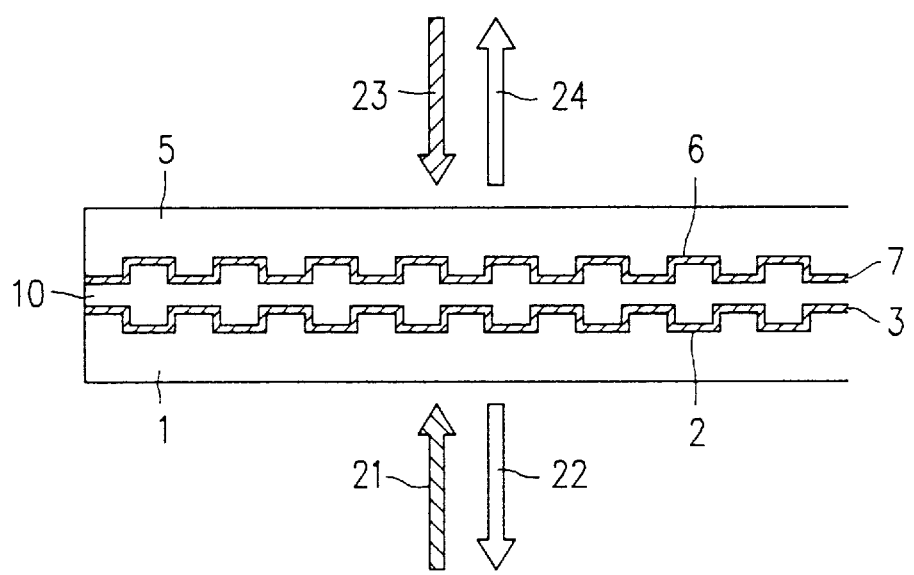
FIG. 1 is a cross-sectional view of an optical information medium according to a first example of the present invention.

Hereinafter, the present invention will be described by way of illustrative examples with reference to accompanying drawings.

EXAMPLE 1

Referring to FIGS. 1, 2 and 3A to 3D, an optical information medium according to an example of the present invention will be described.

First, referring to FIG. 1, the configuration of the optical information medium of this example will be described. The optical information medium includes: a first substrate (thickness: about 0.6 mm) 1 having a first information signal layer (surface) 2; a first reflective film 3 formed on the first information signal layer 2; a second substrate (thickness: about 0.6 mm) 5 having a second information signal layer (surface) 6; and a second reflective film 7 formed on the second information signal layer 6. The first substrate 1 and the second substrate 5 are bonded with each other by a photopolymer resin film 10 provided between the first reflective film 3 and the second reflective film 7.

A plurality of pits with a size defined in accordance with the wavelength of signal reproducing lights 21 and 23 are formed on the information signal layers 2 and 6 of this example. When the substrates 1 and 5 are formed in a disk shape, the pits are arranged in a concentric pattern or a spiral pattern. In some cases, guide grooves for tracking are provided on the information signal layers 2 and 6 separately from the pits. However, according to the present invention, the shape of the information signal layers 2 and 6 is not limited to the particular one. For example, an image macroscopically formed by using pits, grooves or the like (hereinafter, such an image will be referred to as a "pit art") can be formed on the entire surface or a part of the surface of the information signal layers 2 and 6.

The information recorded on the first information signal layer 2 is reproduced by the signal reproducing light 21 incoming through the substrate 1. The light 21 incoming through the substrate 1 is reflected by the reflective film 3 so as to be light 22. By detecting the variation in the intensity of the reflected light 22, the recorded information can be reproduced. On the other hand, the information recorded on the second information signal layer 6 is reproduced by the light 23 incoming through the substrate 5. The light 23 incoming through the substrate 5 is reflected by the reflective film 7 so as to be light 24. The emission of the lights 21 and 23 and the detection of the lights 22 and 24 are performed by a known technology. In the case where the emission of the lights 21 and 23 and the detection of the lights 22 and 24 are performed by a single optical head, the optical information medium is required to be reversed on the way of reproduction in order to continuously reproduce the information from the different information signal layers.

The first reflective film 3 and the second reflective film 7 are preferably made of a metallic material mainly composed of aluminum, and the thickness thereof is 0.05 μm in this example. In order to suitably perform the production method to be described later, it is preferable for at least one of the first reflective film 3 and the second reflective film 7 to have a thickness of 0.1 μm or less. However, depending upon the material for the reflective films, the thickness may be over 0.1 μm in some cases.

In this example, a hot-melt adhesive is not used but instead a photopolymer resin is used. Accordingly, the disk of this example can resist an environment where the temperature reaches up to about 80° C. and the humidity reaches up to about 85% for a long time, and the disk is not therefore deformed to exceed the allowable disk tilt. Therefore, it is possible to provide an optical information medium suitable for the use in a car and excellent in environmental resistance.

It is noted that the optical information medium shown in FIG. 1 will be called a "disk obtained by bonding two thin substrates" in this specification. In general, such a disk is formed in a disk shape (circular with a circular aperture in the center). However, the disk can be a card shaped medium.

Next, referring to FIGS. 1 and FIGS. 3A to 3D, a method for producing the optical information medium will be described.

First, the substrate 1 shown in FIG. 1 is produced by an injection molding method or the like. In the case of performing the injection molding, the substrate 1 is preferably made of a transparent resin such as polycarbonate. In this example, a disk-shaped substrate 1 with a thickness of 0.6±0.03 mm, an outer diameter of 120 mm and an inner diameter of 15 mm is formed. By performing injection molding and the like, a substrate in various shapes and sizes can be easily formed. In the case of performing injection molding, the pits or the like of the first information signal layer 2 are formed during the injection molding. Therefore, the contents of the information are determined by the pattern of the stamper used for the injection molding. However, the substrate 1 may be formed by other methods. Next, the reflective film 3 is formed on the first information signal layer 2 on the substrate 1 by a sputtering method or a vacuum evaporation method.

Another disk-shaped substrate 5 having the second information signal layer 6 formed on one side thereof is separately formed by the injection molding method or the like, and the reflective film 7 is formed on the second information signal layer 6 on the substrate 5 by a sputtering method or a vacuum evaporation method. The second substrate 5 is formed by the same method as the method for forming the first substrate 1. The same shape and size as those of the first substrate 1 are used for the second substrate 5. However, depending upon the applications, different shapes and sizes can be used for the first substrate 1 and the second substrate 5. In this example, by setting the thickness of each of the substrates 1 and 5 to be in a range of 0.57 mm to 0.63 mm, an allowable tilt of the disk can be enlarged to about 0.75 degrees even when an objective lens with an NA of 0.6 or more is used. According to the present invention, one optical information medium is produced by bonding two substrates with each other. Therefore, even if the strength of each of the substrates is further reduced, a serious problem is unlikely to occur. Consequently, it is possible to use an objective lens with a higher NA by setting the thickness of each substrate to be smaller than about 0.6 mm. However, in the case of making the substrates of this invention of a material used for a currently available CD, the thickness of each substrate is preferably 0.3 mm or more in order to maintain a sufficient strength thereof.

The injection molding process or the sputtering process used for forming the respective substrates having an information signal layer on one side thereof are also used in a process for producing a CD. Since the cycle time required for performing the respective process steps is on the order of several seconds, these processes have a very high productivity.

Figure 3A:
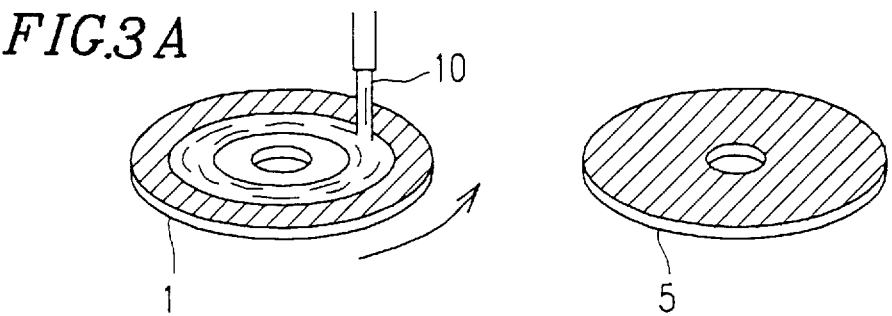
FIGS. 3A to 3D are perspective views showing the respective process steps for producing the optical information medium according to the first example of the present invention.

Next, as shown in FIG. 3A, while rotating the substrate 1 on which the reflective film 3 is formed at a low speed (e.g., 10 to 50 rpm), the photopolymer resin 10 is applied onto the reflective film 3 in a donut shape. In this case, the amount of the photopolymer resin 10 to be applied is set to be in an approximate range of 1 to 5 grams. As the photopolymer resin 10, SD 1700 (product name; manufactured by Dainippon Ink & Chemicals, Inc.) is used, for example. Alternatively, SD101, SD301 or the like can also be used. In addition, instead of a resin curable by UV light, a resin curable by light with a different wavelength can also be used. Therefore, the kind of the photopolymer resin is not particularly limited. However, under the current circumstances, the resin curable by UV light is most practical. In addition, a mixture composed of plural kinds of resins can also be used and the resin can have a multi-layered structure.

Figure 3B:
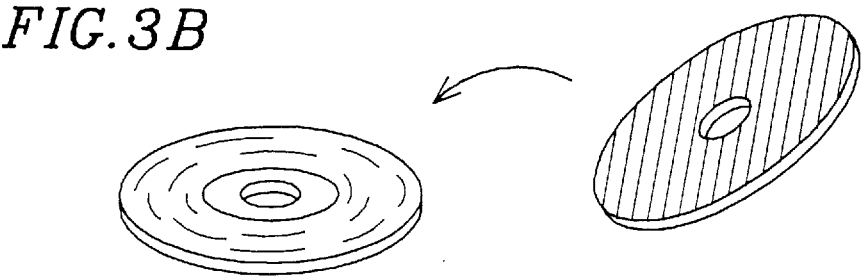

Then, as shown in FIG. 3B, the second substrate 5 is disposed so that the second reflective film 7 faces the photopolymer resin 10, and then superposed on the first substrate 1. Alternatively, the superposition can be performed by disposing the first substrate 1 over the second substrate 5.

Figure 3C:
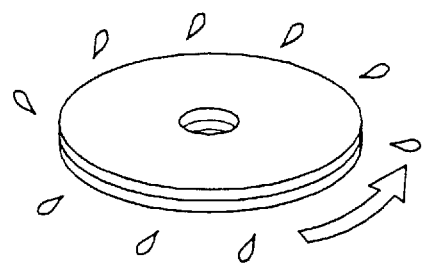

After the photopolymer resin 10 has diffused to the vicinity of the inner periphery of the substrates 1 and 5 between the first reflective film 3 and the second reflective film 7, the first substrate 1 and the second substrate 5 are integrally rotated at a high speed, e.g., at 1000 to 5000 rpm as shown in FIG. 3C, thereby making the thickness of the photopolymer resin 10 substantially uniform between the first and the second reflective films 3 and 7. When the rotation is finished, the thickness of the photopolymer resin 10 becomes approximately 10 to 60 μm. This thickness is optimized by the viscosity and the initial thickness of the photopolymer resin, and the rotation speed and time.

Figure 3D:
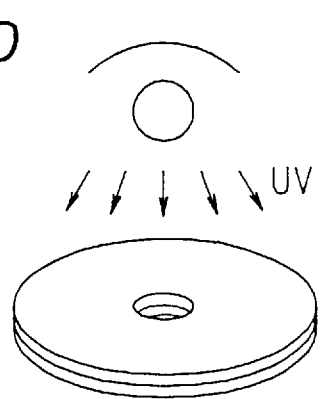

Next, as shown in FIG. 3D, the first substrate 1 is irradiated with the UV rays having a wavelength of 300 to 400 nm, for example. A halogen lamp, a mercury lamp or the like is used as the UV light source, for example. In this example, UV rays with an intensity of 100 to 200 mW/cm$^2$ is irradiated for 10 to 40 seconds. By irradiating the UV rays, the photopolymer resin 10 is cured, the first substrate 1 and the second substrate 5 are integrally combined, and the bonding of the first substrate 1 and the second substrate 5 is completed.

Referring back to FIG. 1, the UV ray irradiation step will be described in further detail. The UV rays (not shown in FIG. 1) irradiated onto the second substrate 5 shown in FIG. 1 are transmitted through the second substrate 5, and then irradiated onto the reflective film 7 formed on the second information signal layer 6. The second substrate 5 is made of a material for transmitting the signal reproducing light 23 at a high transmittance (e.g., 90% or more). In general, such a material also transmits the UV rays at a high transmittance. Most of the UV rays transmitted through the second substrate 5 are reflected by the reflective film 7, while the remaining UV rays are transmitted through the reflective film 7 and incident onto the photopolymer resin 10. When the thickness of the reflective film 7 is in a range of 0.05 to 0.1 μm or less, the UV transmittance of the reflective film 7 mainly composed of aluminum is in an approximate range of 0.1 to 1%. The present inventors have confirmed that the photopolymer resin 10 is cured at a remarkably higher rate than the expected rate, even when the UV transmittance of the reflective film 7 is at such a relatively low level.

More specifically, when the transmittance of the reflective film 7 is 1%, the amount of the UV rays reaching the photopolymer resin 10 is reduced to about one-eightieth or less, as compared with a case of not providing the reflective film. If the calculation is conducted simply based on the data obtained in the case of forming the protective film for a CD from the photopolymer resin, the time required for completely curing the photopolymer resin 10 is generally increased by 80 times or more, typically about 160 seconds or longer. Those skilled in the art would expect that such a long-time UV ray irradiation will make it impossible to produce a practical optical information medium. However, contrary to the expected results, the present inventors have obtained experimental results that the photopolymer resin 10 can be sufficiently cured by performing the UV ray irradiation for a time longer by about 5 to 20 times (or 10 to 40 seconds). Such results derive from the effect attained by interposing the photopolymer resin 10 between the two reflective films. It is considered that the multiple reflection of a slight amount of the UV rays transmitted through the reflective film between the reflective films 3 and 7 plays an important role in accomplishing the effect of the resin in a short period of time. In addition, since the photopolymer resin 10 is irradiated with the UV rays without any contact with air, it is possible to eliminate the adverse effects of oxygen in the air onto the curing of the resin. The present inventors consider that the fact also considerably contribute to the shortening of the irradiation time.

It is most preferable to use a thin film mainly composed of aluminum as the reflective film. However, the reflective film is not limited thereto. The reflective film can be made of other metallic materials, and a multi-layered film, e.g., a dielectric multi-layered film, can also be used as the reflective film.

Instead of the above production method, after the protective film is formed beforehand on the first reflective film 3 or the second reflective film 7, the application of the photopolymer resin 10 for the bonding, the bonding of the two substrates, and then the UV ray irradiation can be performed. By performing the UV ray irradiation in such a manner, it is possible to prevent the deterioration of the information signal layer because of the attachment of dust or the like before the bonding. The protective film is preferably made of a photopolymer resin. In such a case, the respective substrates 1 and 5 can be produced by performing the molding process, the sputtering of the protective film and the formation of the protective film in the same way as the processes for producing a conventional CD. Alternatively, the protective film made of a photopolymer resin can be cured simultaneously with the curing of the photopolymer resin 10 for bonding.

When the photopolymer resin 10 is cured by the UV ray irradiation, a heat is generally generated, thereby deforming the substrate 1 or 5 to a certain degree in some cases. In order to prevent such deformation, as shown in FIG. 2, by pressing the second substrate 5 via a transparent plate 11 (e.g., a glass plate) disposed thereon at least during the UV ray irradiation, the UV rays can be transmitted through the transparent plate 11, the second substrate 5, and the second reflective film (not shown in FIG. 2), thereby curing the resin 10. By disposing such a glass plate 11, a bonded disk where the substrates 1 and 5 are not deformed and the disk tilt is substantially negligible can be produced.

Figure 4:
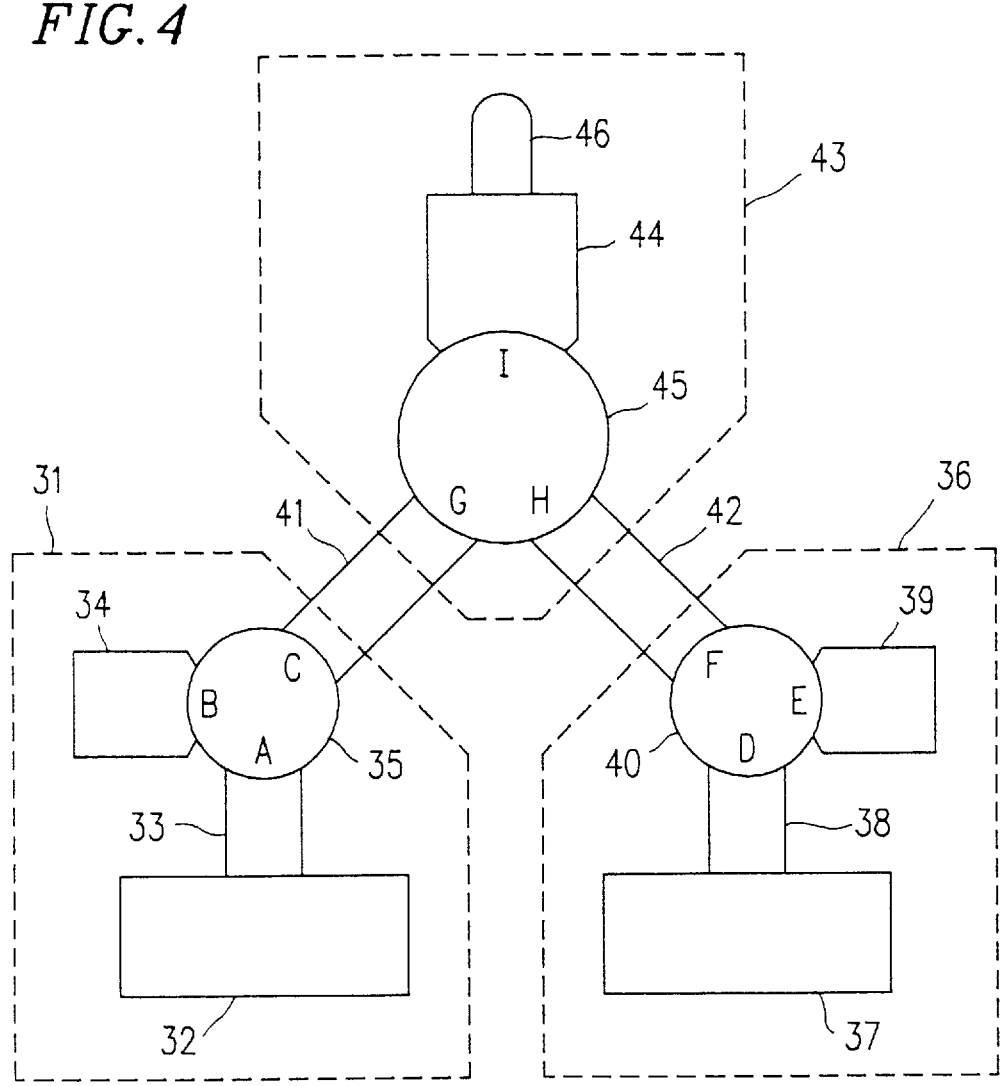
FIG. 4 is a block diagram showing an arrangement for a unit for producing the optical information medium according to the first example of the present invention.

Next, referring to FIG. 4; an exemplary unit for producing the bonded disk will be described. A first block 31 includes: a first molding machine 32; a first carrying robot 33; a first sputtering apparatus 34; and a transporter 35 for connecting these components.

The substrate 1 having the first information signal layer 2 thereon is formed by the molding machine 32 by the injection molding method, and then carried by the carrying robot 33 to the point A on the transporter 35. Then, the substrate 1 is transported by the transporter 35 to the point B, the reflective film 3 is sputtered on the information signal layer 2 by the sputtering apparatus 34, and then the substrate 1 is transported again by the transporter 35 to the point C.

On the other hand, a second block 36 includes: a second molding machine 37; a second carrying robot 38; a second sputtering apparatus 39; and a transporter 40 for connecting these components. The substrate 5 having the second information signal layer 6 thereon is formed by the molding machine 37 by the injection molding method, and then carried by the carrying robot 38 to the point D on the transporter 40. Then, the substrate 5 is transported by the transporter 40 to the point E, the reflective film 7 is sputtered on the information signal layer 6 by the sputtering apparatus 39, and then the substrate 5 is transported again by the transporter 40 to the point F.

The first block 31 and the second block 36 are disposed at adjacent positions. The first block 31 is connected with a third block 43 by-a moving robot 41, while the second block 36 is connected with the third block 43 by a moving robot 42. The third block 43 includes: the moving robots 41 and 42; an UV ray irradiator 44; a transporter 45 for connecting these components; and a stocker 46. The transporter 45 also includes an applicator of the photopolymer resin and a disk rotator, and implements the bonding method described with reference to FIGS. 3A to 3D. This third block 43 functions as a bonding apparatus.

The first substrate 1 is moved from the first block 31 to the point G on the transporter 45 by using the moving robot 41, where the photopolymer resin is applied in a donut shape by rotating the first substrate 1 at a low speed. The second substrate 5 is moved from the second block 36 to the point H on the transporter 45 by using the moving robot 42 and then moved by the transporter 45 to the point G, where the second substrate 5 is superposed on the first substrate 1 so that the first reflective film faces the second reflective film. At the point G, the first and the second substrates are integrally rotated at a high speed, thereby diffusing the photopolymer resin substantially uniformly between the first and the second reflective films.

Thereafter, the assembly is moved to the point I by using the transporter 45 and then moved to the UV ray irradiator 44, where the photopolymer resin is irradiated with the UV rays and cured from the substrate 5 side. The medium thus produced is piled on the stocker 46.

The above example relates to the case where the UV rays are irradiated by moving the assembly from the point I to the UV ray irradiator 44. Alternatively, the UV rays can be irradiated by moving the UV ray irradiator 44 to the point 1. In the case where the disk is pressed via a transparent plate so as not to deform the disk during the UV ray irradiation, the bonding apparatus can be operated more easily.

In this example, the present invention has been described as being applied to an optical disk. However, the present invention is also applicable to other kinds of optical information media such as an optical card.

In this example, the present invention has been described as being applied to a read-only optical information medium. However, by providing a known recording material film between a substrate and a reflective film, the information can be recorded/reproduced onto/from the recording material film by using a laser beam, and a user can freely record private information thereon.

EXAMPLE 2

Hereinafter, referring to FIG. 5 and FIGS. 6A to 6C, an optical information medium according to another example of the present invention will be described. This example relates to a "dual-layer optical information medium" allowing for reproducing the information from two information signal layers by irradiating light from one direction.

Figure 5:
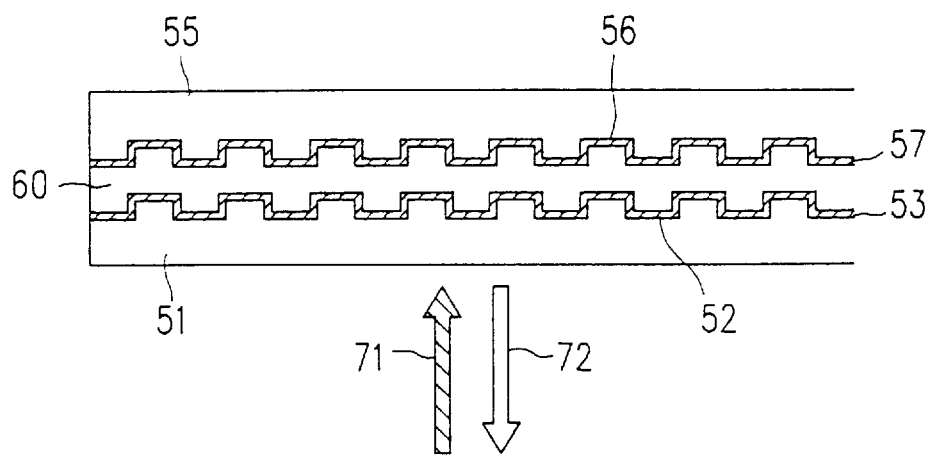
FIG. 5 is a cross-sectional view of an optical information medium according to a second example of the present invention.

First, referring to FIG. 5, the configuration of the optical information medium of this example will be described. The optical information medium includes: a first substrate (thickness: about 0.6 mm) 51 having a first information signal layer 52; a semi-transparent film 53 formed on the first information signal layer 52; a second substrate (thickness: about 0.6 mm) 55 having a second information signal layer 56; and a reflective film 57 formed on the second information signal layer 56. The first substrate 51 and the second substrate 55 are bonded with each other via a photopolymer resin film 60 provided between the semi-transparent film 53 and the reflective film 57.

In this example, a plurality of pits with a size defined in accordance with the wavelength of the signal reproducing light are also formed on the information signal layers 52 and 56. When the substrates 51 and 55 are formed in a disk shape, the pits are arranged in a concentric pattern or a spiral pattern. In some cases, guide grooves for tracking are provided on the information signal layers 52 and 56 separately from the pits. However, according to the present invention, the shape of the information signal layers 52 and 56 is not limited to the particular shape of this example.

The semi-transparent film 53 is made of a metal such as Au and Al or a dielectric such as ZnS. When the semi-transparent film 53 is made of Au, the thickness of the semi-transparent film 53 becomes about 10 nm.

The reflective film 57 is made of a metallic material mainly composed of aluminum and has a thickness of 0.05 $\mu$m in this example.

The information recorded on the first information signal layer 52 is reproduced by the signal reproducing light 71 incoming through the substrate 51. The light 71 incoming through the substrate 51 is reflected by the semi-transparent film 53 so as to be light 72. By detecting the variation in the intensity of the reflected light 72, the recorded information can be reproduced. On the other hand, the information recorded on the second information signal layer 56 is reproduced by the light 71 incoming through the first substrate 51, the semi-transparent film 53 and the photopolymer resin 60. The light 71 is reflected by the reflective film 57 so as to be light 72. In this example, the information recorded on the two information signal layers 52 and 56 can be selectively and continuously reproduced by using the light 71 incoming through the substrate 51. It is not necessary for another light to income through the second substrate 55 in order to reproduce the information recorded on the second information signal layer 56. Therefore, the second substrate 55 is not required to be transparent and the material for the second substrate 55 can be selected very freely.

In addition, if the information recorded on one of the plurality of information signal layers can be recorded/reproduced thereon/therefrom by using a laser beam and the other layers are exclusively used for the reproduction, then the density of the selected layer can be increased, and a user can freely record private information on the selected layer. In such a case, a layer distant from the laser beam incoming side is selected as the layer usable for recording/reproducing information thereon/therefrom. By reducing the laser beam reflectance of the information signal layer closer to the laser beam incoming side, the laser beam can reach the layer distant from the laser beam incoming side, thereby recording/reproducing information thereon/therefrom. In order to record/reproduce information onto/from the layer distant from the laser beam incoming side, a recording material film is required to be provided on the second substrate. The recording material film is formed directly on the reflective film 57, or via another dielectric film. In the case of recording information on the recording material film, grooves for tracking and pits indicating a track number and the like are provided on the second information signal layer 56, thereby making the surface of the second information signal layer 56 uneven. However, video data, audio data, data to be processed by an information processor and the like are recorded not on the second information signal layer 56 itself, but on the recording material film. A known recording material film such as a phase-changeable material film, a magneto-optical material film, or an organic dye material film is used as the recording material film.

Next, referring to FIGS. 6A to 6C, a method for producing the optical information medium shown in FIG. 5 will be described.

Figure 6A:
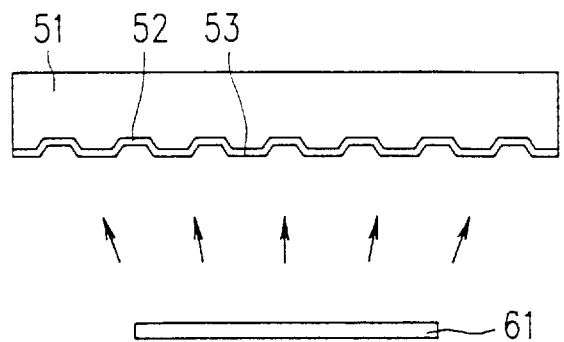
FIGS. 6A to 6C are cross-sectional views showing the respective process steps for producing the optical information medium according to the second example of the present invention.

First, as shown in FIG. 6A, a transparent substrate 51 having a first information signal layer 52 is formed by an injection molding method or the like. The first information signal layer 52 functions as the information signal layer closer to the laser beam incoming side. In the case of performing the injection molding, the substrate 51 is preferably made of a transparent resin such as polycarbonate. In this example, a disk-shaped substrate 51 with a thickness of 0.58±0.03 mm, an outer diameter of 120 mm and an inner diameter of 15 mm is formed. Next, a semi-transparent film 53 is formed on the first information signal layer 52 on the first substrate 51 by a sputtering method or a vacuum evaporation method. A target 61 used for the sputtering is made of the same material for composing the semi-transparent film 53.

Figure 6B:
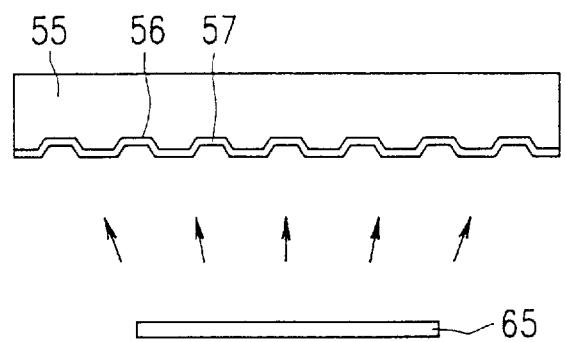

As shown in FIG. 6B, another disk-shaped substrate 55 having a second information signal layer 56 on one side thereof is separately formed by the injection molding method or the like, and the reflective film 57 is formed on the second information signal layer 56 on the substrate 55 by a sputtering method or a vacuum evaporation method. When the optical information medium is to be exclusively used for reproduction, a target 65 is made of a metallic material such as aluminum. On the other hand, when the optical information medium is to be used for recording and reproduction, a phase-changeable material or a magneto-optical material is additionally used for the target 65. In this example, the same shape and size as those of the first substrate 51 are used for the second substrate 55. In view of the reflectance and the like, the reflective film 57 is preferably made of a metallic material mainly composed of aluminum.

The injection molding process and the sputtering process used for forming the respective substrates 51 and 55 having an information signal layer on one side thereof are a known process used for producing a CD. Since the cycle time required for performing the respective process steps is on the order of several seconds, these processes have a very high productivity.

Next, while rotating the transparent substrate 51, a photopolymer resin 60 is applied onto the semi-transparent film 53. The photopolymer resin 60 has a refractive index close to that of the substrate 51. In this example, the refractive index of the photopolymer resin 60 is in an approximate range of 1.48 to 1.55. On the other hand, the refractive index of the substrate 51 is in an approximate range of 1.5 to 1.6.

Figure 6C:
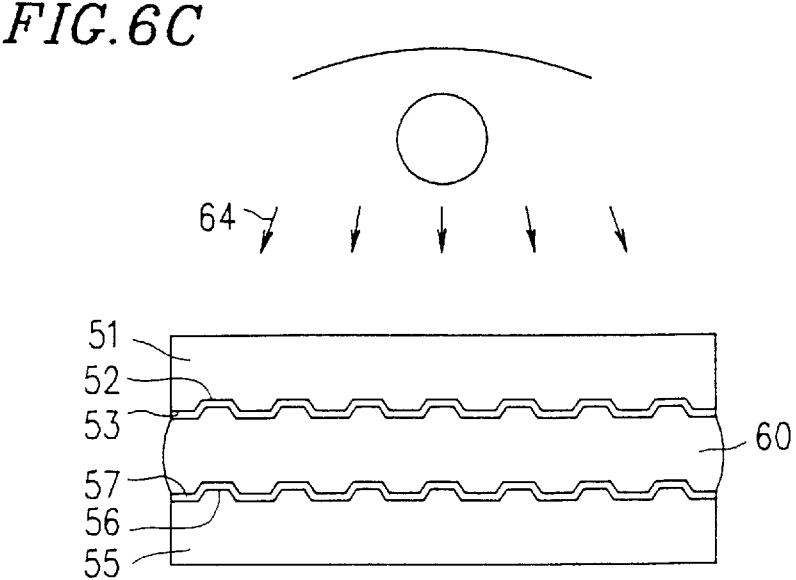

Then, as shown in FIG. 6C, the first substrate 51 is disposed so that the reflective film 57 faces the photopolymer resin 60, and then superposed on the second substrate 55. Thereafter, the photopolymer resin 60 is irradiated with UV rays 64 through the transparent substrate 51 and the semi-transparent film 53. In the second example, these photopolymer resin curing steps can be performed in substantially the same way as those of the first example. The production steps of the second example are different from those of the first example in that the photopolymer resin 60 is irradiated with UV rays 64 through the semi-transparent film 53. However, in this case, the multiple reflection of the light transmitted through the semi-transparent film 53 can also be performed between the semi-transparent film 53 and the reflective film 57, thereby promoting the curing of the photopolymer resin 60. The UV transmittance of the semi-transparent film 53 is in an approximate range of 20 to 70%. Therefore, the semi-transparent film 53 functions as a sort of reflective film so as to complete the curing of the resin in a shorter time than an expected time based on the curing mechanism similar to that described in the first example.

Because of the above-mentioned reasons, the transparent substrate 51 is preferably pressed via a transparent plate (not shown) or the like. In this way, the two information signal layers 52 and 56 are opposed so as to be separated from each other by a substantially uniform gap, and the first substrate 51 can be bonded with the second substrate 55. In this example, the thickness of the photopolymer resin film is set to be in a range of 30 to 60 $\mu$m. By setting the thickness at such a value, the information can be reproduced while making the gap between the two information signal layers sufficiently large. It is not preferable for the thickness to exceed 60 $\mu$m, because an aberration is possibly caused in focusing the laser beam.

In a process for forming a protective film for a CD, the respective process steps of applying the photopolymer resin and irradiating the UV rays are also performed and result in a high productivity. Therefore, by performing the process step shown in FIG. 6C, a sufficiently high productivity is realized. In addition, unlike a conventional method in which an information signal layer is formed by using a photopolymer resin, the information signal layer 56 is formed by an injection molding method. Accordingly, a large amount of dust is not likely to be attached to the surface of the information signal layer 56, thereby reducing defects.

Figure 7:
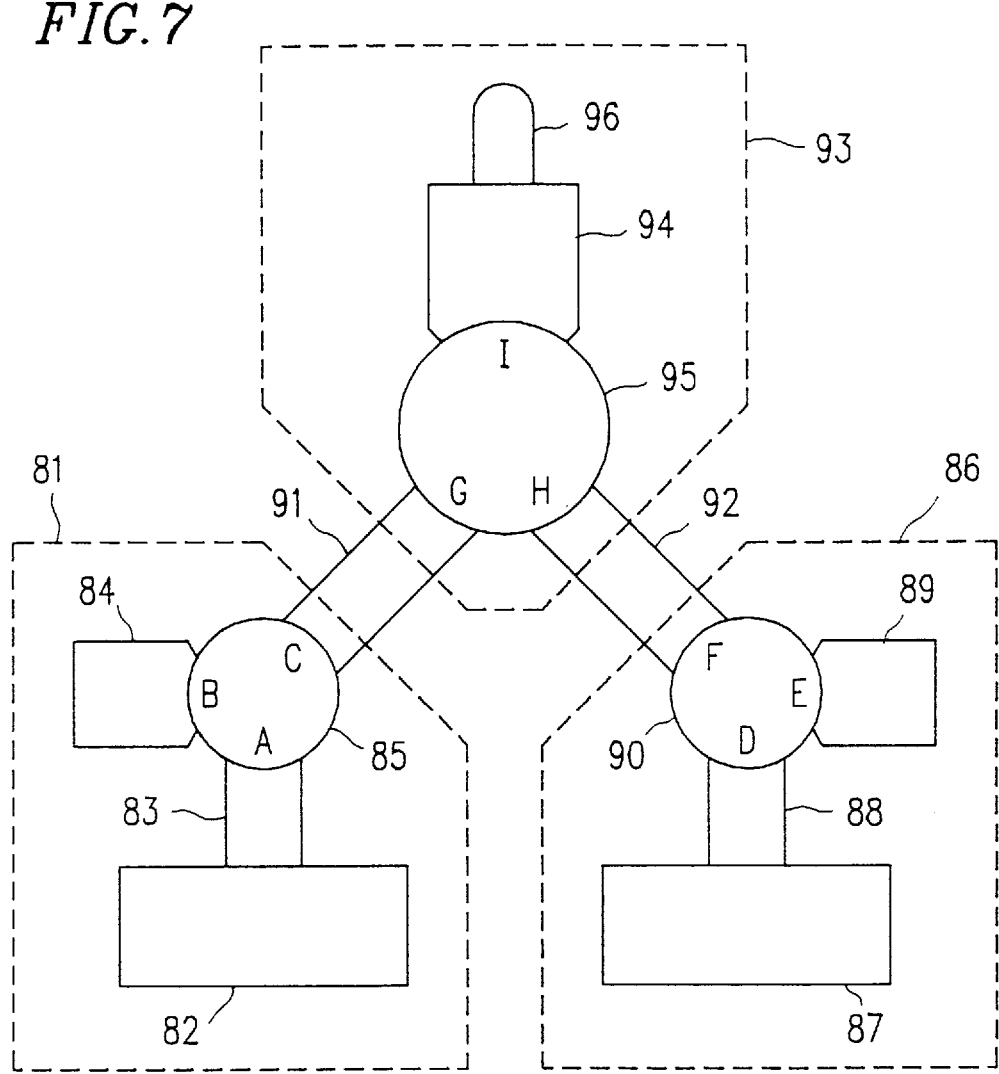
FIG. 7 is a block diagram showing an arrangement for a unit for producing the optical information medium according to the second example of the present invention.
Figure 8:
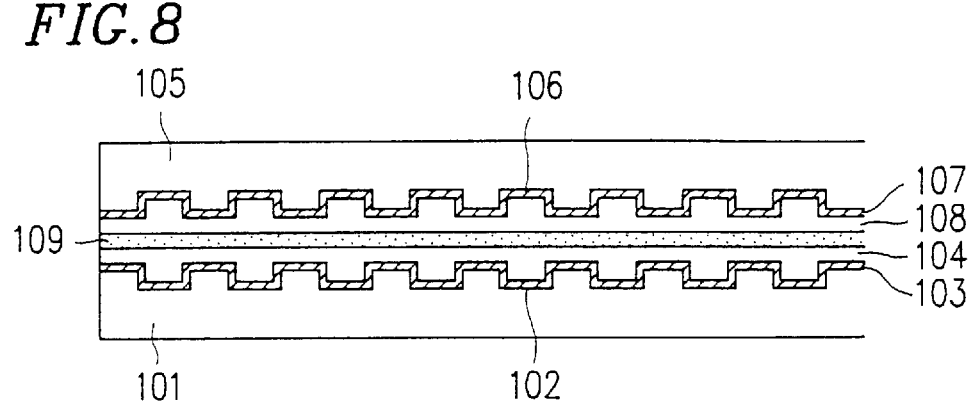
FIG. 8 is a cross-sectional view of a conventional optical information medium.
Figure 9:
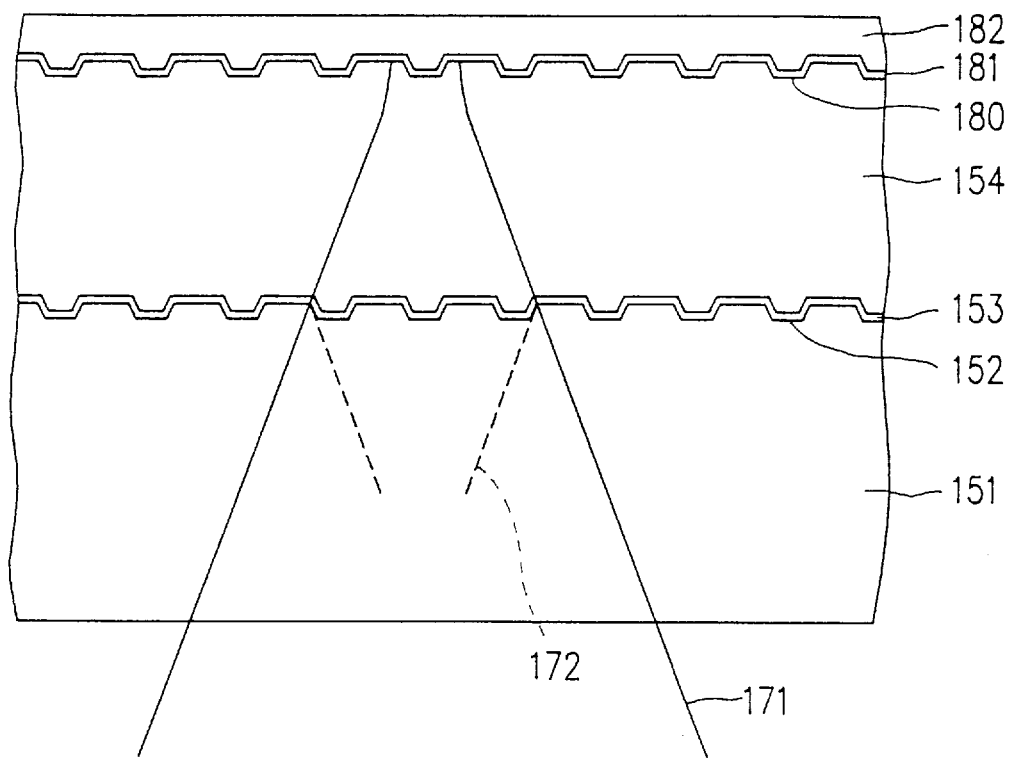
FIG. 9 is a cross-sectional view of another conventional optical information medium.
Figure 10A:
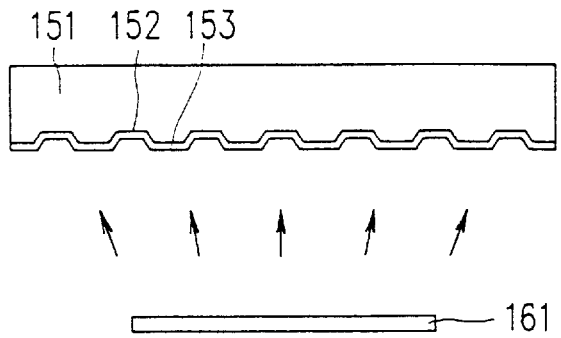
FIGS. 10A to 10C are cross-sectional views showing the respective process steps for producing a conventional optical information medium.
Figure 10B:
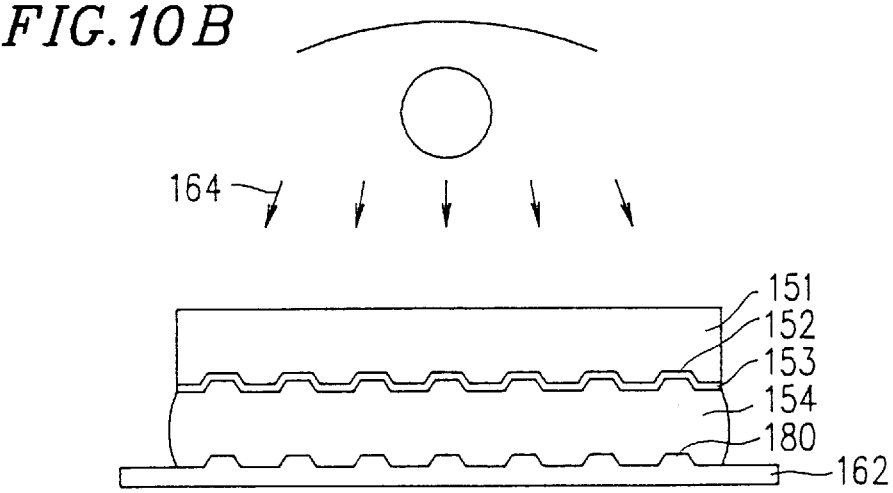
Figure 10C:
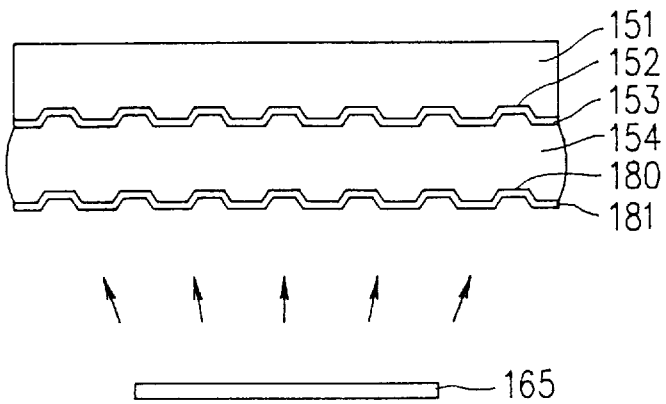

FIG. 7 shows a unit for producing a dual-layer optical information medium. As shown in FIG. 7, a first block 81 includes: a first molding machine 82; a first carrying robot 83; a first sputtering apparatus 84; and a transporter 85 for connecting these components. The transparent substrate 51 having the first information signal layer 52 thereon is formed by the molding machine 82 by the injection molding method, and then carried by the carrying robot 83 to the point A on the transporter 85. Then, the substrate 51 is transported by the transporter 85 to the point B, the semi-transparent thin film 53 is sputtered on the information signal layer 52 by the sputtering apparatus 84, and then the substrate 51 is transported again by the transporter 85 to the point C.

On the other hand, a second block 86 includes: a second molding machine 87; a second carrying robot 88; a second sputtering apparatus 89; and a transporter 90 for connecting these components. The substrate 55 having the second information signal layer 56 thereon is formed by the molding machine 87 by the injection molding method, and then carried by the carrying robot 88 to the point D on the transporter 90. Then, the substrate 55 is transported by the transporter 90 to the point E, the reflective film 57 is sputtered on the information signal layer 56 by the sputtering apparatus 89, and then the substrate 55 is transported again by the transporter 90 to the point F.

The first block 81 and the second block 86 are disposed at the adjacent positions. The first block 81 is connected with the third block 93 by a moving robot 91, while the second block 86 is connected with the third block 93 by a moving robot 92. The third block 93 includes: the moving robots 91 and 92; an UV ray is irradiator 94; a transporter 95 for connecting these components; and a stocker 96. The transporter 95 also functions as an applicator of the photopolymer resin.

The first substrate 51 is moved from the first block 81 to the point G on the transporter 95 by using the moving robot 91, where the photopolymer resin 60 is applied by rotating the transparent substrate 51 and the transparent substrate 51 is transported by the transporter 95 to the point H. The second substrate 55 is moved from the second block 86 to the point H on the transporter 95 by using the moving robot 92, where the second substrate 55 is superposed on the transparent substrate 51. The assembly is transported again by the transporter 95 to the point I and then moved to the UV ray irradiator 94, where the photopolymer resin is irradiated with the UV rays 64 and cured from the transparent substrate 51 side. The medium thus produced is piled on the stocker 96.

Thereafter, the printing for a label and the like may be performed. Alternatively, a printing apparatus can be directly connected with the UV ray irradiator 94. A label is printed on a protective film made of a photopolymer resin in a common CD. However, in the dual-layer optical information medium of the invention, the label is printed on a plane on the opposite side to the information signal layer 56 of the substrate 55.

According to the present invention, it is not necessary to perform an extra bonding process step using a roll coater for applying a hot-melt adhesive or a presser in addition to the common process steps for producing a CD, so that it is possible to provide a disk obtained by bonding thin substrates, a method for producing the same and a unit for producing the same without considerably increasing the cost. Moreover, since a photopolymer resin is not softened in an environment where temperature and humidity are high, unlike a hot-melt adhesive, it is possible to provide a high-density optical disk which can be used in a car.

As is apparent from the foregoing description, according to the present invention, the two information signal layers are separately formed by performing the injection molding and sputtering processes, and the two information signal layers are superposed during the photopolymer resin application and curing processes, so that it is possible to provide a multi-layered optical information medium which can be produced at a lower cost by applying the highly productive CD production process steps thereto so as to have less defects.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information medium comprising:

a first substrate having a first information surface;

a first reflective film formed on the first information surface of the first substrate;

a second substrate having a second information surface;

a second reflective film formed on the second information surface of the second substrate; and a photopolymer resin film provided between the first reflective film and the second reflective film for bonding the first substrate and the second substrate with each other, wherein the photopolymer resin film is cured by irradiation of light passing through at least one of the first reflective film and the second reflective film, part of the irradiated light undergoing a multiple reflection between the first reflective film and the second reflective film to reduce the time required to cure the photopolymer resin film.

2. An optical information medium according to claim 1, wherein the first and the second reflective films are made of a metallic material mainly composed of aluminum.

3. An optical information medium according to claim 1, wherein at least one of the first and the second reflective films has a thickness of 0.1 μm or less.

4. An optical information medium according to claim 1, wherein the first and the second substrates have a substantially equal thickness.

5. An optical information medium according to claim 4, wherein the first and the second substrates have a thickness of 0.57 mm to 0.63 mm.

6. An optical information medium according to claim 1, wherein a pit art is formed on at least one of the first information surface and the second information surface.

7. An optical information medium according to claim 1, wherein a recording material film is provided at least one of between the first substrate and the first reflective film and between the second substrate and the second reflective film.

8. A method for producing an optical information medium, comprising the steps of:

forming a first substrate having a first information surface on one side thereof;

forming a first reflective film on the first information surface of the first substrate;

forming a second substrate having a second information surface on one side thereof;

forming a second reflective film on the second information surface of the second substrate;

superposing the first and the second substrates so that the first and the second reflective films are opposed to each other with a photopolymer resin therebetween; and irradiating the photopolymer resin with light at least through the second substrate and the second reflective film so as to obtain multiple reflection of at least a part of the light between the first and the second reflective films and to reduce the time required to cure the photopolymer resin, thereby bonding the first and the second substrates with each other.

9. A method for producing an optical information medium according to claim 8, wherein the step of superposing the first and the second substrates comprises the steps of:

applying the photopolymer resin in a donut shape while rotating the first substrate, and superposing the second substrate on the first substrate so that the first and the second reflective films are opposed to each other via the photopolymer resin so as to integrally rotate the first and the second substrates.

10. A method for producing an optical information medium according to claim 8, further comprising a step of disposing a transparent plate on the second substrate so as to press the second substrate via the transparent plate after performing the step of superposing the second substrate on the first substrate so as to integrally rotate the first and the second substrates.

11. A method for producing an optical information medium according to claim 8, wherein the first and the second reflective films are made of a metallic material mainly composed of aluminum.

12. An optical information medium comprising:

a first substrate having a first information surface;

a semi-transparent film formed on the first information surface of the first substrate;

a second substrate having a second information surface;

a reflective film formed on the second information surface of the second substrate; and a photopolymer resin film provided between the semi-transparent film and the reflective film for bonding the first substrate and the second substrate with each other, part of the irradiated light undergoing a multiple reflection between the first reflective film and the second reflective film to reduce the time required to cure the photopolymer resin film.

13. An optical information medium according to claim 12, wherein the reflective film includes a recording material film.

14. An optical information medium according to claim 12, wherein a thickness of the first substrate is in a range of 0.55 to 0.61 mm.

15. An optical information medium according to claim 12, wherein a thickness of the photopolymer resin is in a range of 30 to 60 μm.

16. An optical information medium according to claim 12, wherein a pit art is formed on at least one of the first information surface and the second information surface.

17. A method for producing an optical information medium, comprising the steps of:

forming a first substrate having a first information surface on one side thereof;

forming a semi-transparent film on the first information surface of the first substrate;

forming a second substrate having a second information surface on one side thereof;

forming a reflective film on the second information surface of the second substrate;

superposing the first and the second substrates so that the semi-transparent film and the reflective film are opposed to each other with a photopolymer resin therebetween; and irradiating the photopolymer resin with light at least through the first substrate and the semi-transparent film so as to obtain a multiple reflection of at least a part of the light between the semi-transparent film and the reflective film and to reduce the time required to cure the photopolymer resin, thereby bonding the first and the second substrates with each other.

18. A unit for producing an optical information medium comprising:

a first production block comprising a first molding machine for forming a first substrate including a first information surface thereon, and a first sputtering apparatus for forming a semi-transparent film on the first information surface of the first substrate;

a second production block comprising a second molding machine for forming a second substrate including a second information surface thereon, and a second sputtering apparatus for forming a reflective film on the second information surface of the second substrate;

a third production block for opposing the semi-transparent film on the first substrate and the reflective film on the second substrate with each other with a photopolymer resin film therebetween then irradiating the photopolymer resin film with light at least through the first substrate and the semi-transparent film, part of the irradiated light undergoing a multiple reflection between the first reflective film and the second reflective film to reduce the time required to cure the photopolymer resin film; and a transporter for moving the first substrate from the first production block to the third production block and moving the second substrate from the second production block to the third production block, respectively.

19. A method for producing an optical information medium, comprising the steps of:

forming a first substrate having a first information surface on one side thereof;

forming a first reflective film on the first information surface of the first substrate;

forming a second substrate having a second information surface on one side thereof;

forming a second reflective film on the second information surface of the second substrate;

superposing the first and the second substrates so that the first and the second reflective films are opposed to each other with a photopolymer resin therebetween; and irradiating the photopolymer resin with light through at least one of the first reflective film and the second reflective film to cure the photopolymer resin, thereby bonding the first and the second substrates with each other, part of the irradiated light undergoing a multiple reflection between the first reflective film and the second reflective film to reduce the time required to cure the photopolymer resin.

20. An optical information medium comprising:

a first substrate having a first information surface;

a first film, formed on the first information surface of the first substrate, for reflecting at least a part of light incident thereon;

a second substrate having a second information surface;

a second film, formed on the second information surface of the second substrate, for reflecting at least a part of light incident thereon; and a photopolymer resin film provided between the first film and the second film for bonding the first substrate and the second substrate with each other, wherein at least one of the first film and the second film is semi-transparent, wherein the photopolymer resin film is cured by irradiation of light which is transmitted through at least one of the at least one semi-transparent film, part of the irradiated light undergoing a multiple reflection between the first film and the second film to reduce the time required to cure the photopolymer resin film.

21. A method for producing an optical information medium, comprising the steps of:

forming a first substrate having a first information surface on one side thereof;

forming a first semi-transparent reflection film on the first information surface of the first substrate;

forming a second substrate having a second information surface on one side thereof;

forming a second reflection film on the second information surface of the second substrate;

superposing the first and the second substrates so that the first semi-transparent reflection film and the second reflection film are opposed to each other with a photopolymer resin therebetween; and irradiating the photopolymer resin with light at least through the first substrate and the first semi-transparent reflection film to cure the photopolymer resin, wherein the photopolymer resin is cured by irradiation of light which is transmitted through the semi-transparent reflection film, part of the irradiated light undergoing a multiple reflection between the first reflection film and the second reflection film to reduce the time required to cure the photopolymer resin, thereby bonding the first and the second substrates with each other.

* * * * *